US012351972B2

(12) United States Patent
Wang

(10) Patent No.: US 12,351,972 B2
(45) Date of Patent: Jul. 8, 2025

(54) DOOR LOCK AND ELECTRONIC APPARATUS

(71) Applicant: Illinois Tool Works Inc., Glenview, IL (US)

(72) Inventor: Yang Wang, Dongguan (CN)

(73) Assignee: Illinois Tool Works Inc., Glenview, IL (US)

( * ) Notice: Subject to any disclaimer, the term of this patent is extended or adjusted under 35 U.S.C. 154(b) by 727 days.

(21) Appl. No.: 17/294,643

(22) PCT Filed: Nov. 5, 2019

(86) PCT No.: PCT/US2019/059772

§ 371 (c)(1),
(2) Date: May 17, 2021

(87) PCT Pub. No.: WO2020/112310

PCT Pub. Date: Jun. 4, 2020

(65) Prior Publication Data

US 2022/0010478 A1 Jan. 13, 2022

(30) Foreign Application Priority Data

Nov. 29, 2018 (CN) ......................... 201811441896.1
Nov. 29, 2018 (CN) ......................... 201821990595.X

(51) Int. Cl.

*D06F 39/14* (2006.01)
*E05B 47/06* (2006.01)
*E05C 19/02* (2006.01)

(52) U.S. Cl.

CPC .......... *D06F 39/14* (2013.01); *E05B 47/0603* (2013.01); *E05C 19/02* (2013.01); *E05Y 2900/312* (2013.01); *Y10S 292/69* (2013.01)

(58) Field of Classification Search

CPC ........ D06F 39/14; D06F 37/422; D06F 34/20; E05B 47/0603; E05B 17/0025;

(Continued)

(56) References Cited

U.S. PATENT DOCUMENTS 2,946,612 A * 7/1960 Ahlgren ................ E05C 19/066
411/510
3,841,674 A * 10/1974 Bisbing ..................... E05B 9/08
292/DIG. 53

(Continued)

FOREIGN PATENT DOCUMENTS

EP 1418266 5/2004
EP 1681386 7/2006

(Continued)

OTHER PUBLICATIONS

International Search Report and Written Opinion for International Application No. PCT/US2019/059772 filed Nov. 5, 2019, dated Mar. 23, 2020, 14 pages.

(Continued)

*Primary Examiner* — Kristina R Fulton
*Assistant Examiner* — Faria F Ahmad
(74) *Attorney, Agent, or Firm* — Boyle Fredrickson, S.C.

(57) ABSTRACT

The present application discloses a door lock, which may be implemented on a door panel of an electrical device such as a washing machine. The lock includes a housing that can be installed into the panel without hardware such as a mounting screw, eliminating a need to position a screw in the panel for mounting the lock. The lock housing may include a lock head that can move into or out of a groove formed as a recess into a clamping edge of the housing. Ramped surfaces and contact faces of the housing are provided that allow rotation of the housing during its installation into the panel, which force the lock head into the groove during the housing (Continued)

insertion into the panel and allow the lock head to restore by moving out of the groove when the housing is in an installed position, locking the housing in place.

15 Claims, 9 Drawing Sheets

(58) Field of Classification Search
CPC ...... E05C 19/02; Y10S 292/53; Y10S 292/69; A47L 15/4259
See application file for complete search history.

(56) References Cited

U.S. PATENT DOCUMENTS

| | | | | | |
|---|---|---|---|---|---|
| 4,365,830 | A * | 12/1982 | Paulson | D06F 37/42 292/89 | |
| 5,002,319 | A * | 3/1991 | Chandler | E05C 19/063 292/17 | |
| 5,183,302 | A * | 2/1993 | Pelachyk | E05B 85/13 292/DIG. 31 | |
| 6,082,787 | A * | 7/2000 | Chioffi | D06F 37/42 292/341.15 | |
| 6,145,898 | A * | 11/2000 | Onderka | D06F 37/42 292/228 | |
| 8,016,328 | B2 * | 9/2011 | Sans Rovira | D06F 37/42 292/213 | |
| 8,246,089 | B2 * | 8/2012 | Mueller | D06F 39/14 292/341.15 | |
| 8,727,391 | B2 * | 5/2014 | Berginc | D06F 39/14 292/144 | |
| 9,957,657 | B2 * | 5/2018 | Dirnberger | D06F 39/14 | |
| 10,119,312 | B2 * | 11/2018 | Wang | E05C 19/12 | |
| 11,781,345 | B2 * | 10/2023 | Lang | D06F 39/14 70/278.7 | |
| 2004/0104582 | A1 * | 6/2004 | Hwang | E05C 19/028 292/121 | |
| 2006/0001270 | A1 * | 1/2006 | Kobayashi | E05B 17/0041 292/2 | |
| 2006/0232080 | A1 * | 10/2006 | Washington | E05B 9/08 292/337 | |
| 2008/0100066 | A1 * | 5/2008 | Mueller | D06F 39/14 292/251.5 | |
| 2008/0231061 | A1 * | 9/2008 | Rocchitelli | D06F 37/42 292/303 | |
| 2008/0238113 | A1 * | 10/2008 | Ricchitelli | A47L 15/4259 292/302 | |
| 2010/0295324 | A1 * | 11/2010 | Sea | D06F 39/14 292/65 | |
| 2011/0062839 | A1 * | 3/2011 | Kim | D06F 39/14 312/228 | |
| 2014/0265378 | A1 * | 9/2014 | Lee | E05C 19/024 292/341.17 | |
| 2015/0102612 | A1 * | 4/2015 | Tarr | E05C 17/56 292/251.5 | |
| 2016/0160422 | A1 * | 6/2016 | Lee | D06F 34/20 312/326 | |
| 2016/0222573 | A1 * | 8/2016 | Dirnberger | D06F 39/14 | |
| 2017/0145613 | A1 * | 5/2017 | Choi | D06F 37/42 | |
| 2017/0188785 | A1 * | 7/2017 | Park | A47L 15/4259 | |
| 2017/0362766 | A1 * | 12/2017 | Cho | D06F 34/20 | |
| 2019/0017216 | A1 * | 1/2019 | Dirnberger | E05C 19/022 | |
| 2020/0115923 | A1 * | 4/2020 | DeYoung | E05B 17/22 | |
| 2021/0363802 | A1 * | 11/2021 | Promutico | E05C 19/024 | |
| 2023/0292980 | A1 * | 9/2023 | Dirnberger | A47L 15/4263 134/56 D | |
| 2024/0011327 | A1 * | 1/2024 | Bauriedl | A47L 15/4259 | |

FOREIGN PATENT DOCUMENTS

| | | | | |
|---|---|---|---|---|
| EP | 1681386 | A1 * | 7/2006 | D06F 39/14 |
| EP | 1936018 | A2 | 6/2008 | |
| EP | 2148027 | A1 * | 1/2010 | E05B 47/0002 |
| KR | 20110035034 | A * | 4/2011 | D06F 37/10 |
| WO | WO-2006004317 | A1 * | 1/2006 | D06F 37/10 |
| WO | WO-2010092528 | A1 * | 8/2010 | A47L 15/4259 |
| WO | 2012084483 | A1 | 6/2012 | |
| WO | 2014161784 | A1 | 10/2014 | |
| WO | WO-2017174781 | A1 * | 10/2017 | |

OTHER PUBLICATIONS

Office Action for Application No. KR 10-2021-7018709 dated Sep. 10, 2024 (machine translation from the USPTO's Global Dossier accessed Oct. 9, 2024).
Rule 114(2) EPC Communication dated Jan. 2, 2025 from EP App. No. 19835921.8 (5 pages).

* cited by examiner

A-A

DOOR LOCK AND ELECTRONIC APPARATUS

CROSS-REFERENCE TO RELATED APPLICATIONS

This international application claims priority to Chinese Patent Application No. 201811441896.1, filed on: Nov. 29, 2018 and to Chinese Patent Application No. 201821990595.X, filed on: Nov. 29, 2018 and each of which is incorporated herein by reference in its entirety.

TECHNICAL FIELD

The present application relates to door locks for electrical devices, specifically those that can be installed on panels of electrical devices.

BACKGROUND

A door lock can be used to lock a door of an electrical device, such as a washing machine. A door hook hole is provided on the door lock, and the door lock is installed on a panel of the electrical device. In this way, when a lock hook installed on the door of the electrical device is inserted into the door hook hole, a locking mechanism in the door lock can lock the door hook, thus locking the door of the electrical device on the panel of the electrical device.

The present application provides a door lock for an electrical device such as a washing machine, allowing for reliable installation as well as easy installation and detachment.

SUMMARY OF THE INVENTION

One of the objectives of the present application is to provide a door lock that can be installed without reinforcement by screwing, so that it is not necessary to set a positioning hole for a screw on the panel of the electrical equipment, so as to achieve the technical effects of easy installation, precision and stability, as well as aesthetic assembly. The specific technical schemes are as follows:

A first aspect of the present application provides a door lock including: a housing; a door hook hole body, the door hook hole body being provided on the housing, the door hook hole body including a top, a first pair of oppositely provided sidewalls, and a second pair of oppositely provided sidewalls, wherein the first pair of sidewalls and the second pair of sidewalls are formed respectively by extending downward from the lower part of the top; a pair of clamping edges including a first clamping edge and a second clamping edge, the pair of clamping edges extending outward respectively from the first pair of sidewalls from the top of the door hook hole body; a groove formed by recessing upward from the lower surface of the first clamping edge; and a lock head provided below the groove, wherein the lock head is capable of moving into or out of the groove. A pair of first contact faces and a pair of second contact faces are respectively formed by the housing extending from the outer sides of the second pair of sidewalls, the pair of second contact faces are respectively formed by the distal ends of the pair of first contact faces extending obliquely downward, and a pair of supporting parts are formed at the junctions of the pair of first contact faces and the pair of second contact faces.

According to the first aspect above, the pair of second contact faces are sloped faces extending downward from the pair of first contact faces, and acute angles are formed between the extended faces of the pair of second contact faces and the pair of first contact faces.

According to the first aspect above, the door lock is installed in an installation hole of an installation panel through the door hook hole body, the installation hole has a pair of oppositely provided rims, the pair of rims include a first rim and a second rim, the first clamping edge of the door hook hole body is used for being installed on the first rim of the installation hole, and the second clamping edge of the door hook hole body is used for being installed on the second rim of the installation hole. During installation, when the lock head is hung on the first rim of the installation hole, the pair of second contact faces come into contact with the installation panel.

According to the first aspect above, during the installation, when the door hook hole body rotates around the supporting part, the lock head moves into the groove, and the pair of first contact faces come into contact with the installation panel; and when the door hook hole body moves toward the second rim of the installation hole, the lock head moves out of the groove.

According to the first aspect above, there is a predetermined distance between the lower surface of the second clamping edge and the pair of first contact faces, and the predetermined distance matches the thickness of the installation panel.

According to the first aspect above, the door lock further includes a base installed below the housing; and a cantilever, the cantilever is laterally provided on the base, and is on the outer side of the first sidewall of the first pair of sidewalls of the door hook hole body, with the lock head provided on the upper part of the cantilever.

According to the first aspect above, the proximal end of the cantilever is connected to the base, the cantilever extends laterally from the base, the distal end of the cantilever is a free end, and the lock head is connected to the side of the cantilever adjacent to the distal end.

According to the first aspect above, the distal end of the cantilever has an operating part, and by uplifting the operating part, the distal end of the cantilever moves upward, thereby driving the lock head to move upward.

According to the first aspect above, the cantilever is elastic, and elastic deformation of the cantilever enables the lock head to move into the groove.

According to the first aspect above, the lock head includes an outwardly extending hook edge, wherein when the lock head is hung on the first rim of the installation hole, the hook edge catches the first rim of the installation hole.

According to the first aspect above, the door lock further includes: a guiding slot, wherein the first pair of sidewalls include a first sidewall and a second sidewall, wherein the guiding slot is formed by the first sidewall recessing inward, and a guide rail extending downward is provided on the outer side of the guiding slot; the inner side of the cantilever is provided with a sliding slot extending downward, wherein the sliding slot on the cantilever and the guide rail on the guiding slot slide with respect to one another for guiding the lock head to move up and down.

According to the first aspect above, the groove has a width capable of accommodating the lock head.

According to the first aspect above, the door hook hole body is rectangular, the door hook hole body is provided with a door hook hole, and the pair of clamping edges are provided respectively on two sides of the door hook hole body in a length direction.

In a second aspect of the present application, there is provided an electrical equipment including a panel provided with an installation hole, the electrical equipment includes the door lock defined by the first aspect, wherein the door hook hole body of the door lock is installed in the installation hole.

According to the second aspect above, the electrical equipment is a washing machine.

For the door lock and the electrical equipment provided by the present application, the door lock is installed in the installation hole of the installation panel through the door hook hole body, and reinforcement by screwing is not required, so that it is not necessary to set positioning holes for screws on the panel of the electrical equipment. The present application has achieved the technical effects of high installation precision, good stability and aesthetic assembly.

DETAILED DESCRIPTION

Figure 1:
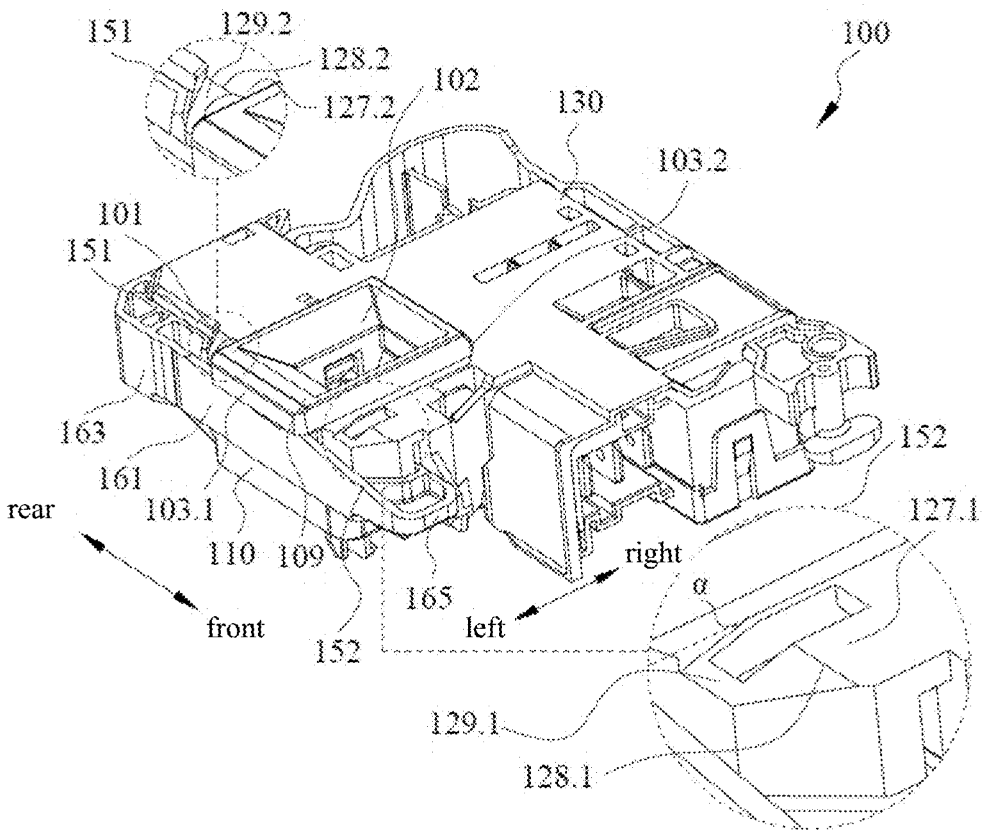
FIG. 1 is a three-dimensional structural view of a door lock 100 according to the present application.

Various embodiments of the present application will be described below with reference to the accompanying drawings that form a part of this specification. It should be understood that, although directional terms such as “front”, “rear”, “upper”, “lower”, “left”, “right”, “inner”, “outer”, “distal”, “proximal” and the like are used in the present application to describe the orientations of various exemplary structural parts and elements of the present application, these terms are used herein only for convenience of illustration and are determined based on the exemplary orientations shown in the drawings. Since the embodiments disclosed in the present application can be configured in different directions, these directional terms are merely illustrative and are not to be considered as limiting. Wherever possible, the same or similar reference numerals used in the present application refer to the like parts.

FIG. 1 is a three-dimensional structural view of a door lock 100 of the present application for illustrating the overall structure of the door lock 100 of the present application; wherein a dashed box 151 and a dashed box 152 respectively illustrate locally enlarged structural views, showing the specific structures of a pair of first contact faces (first contact faces 127.1 and 127.2) and a pair of second contact faces (second contact faces 129.1 and 129.2).

Figure 2:
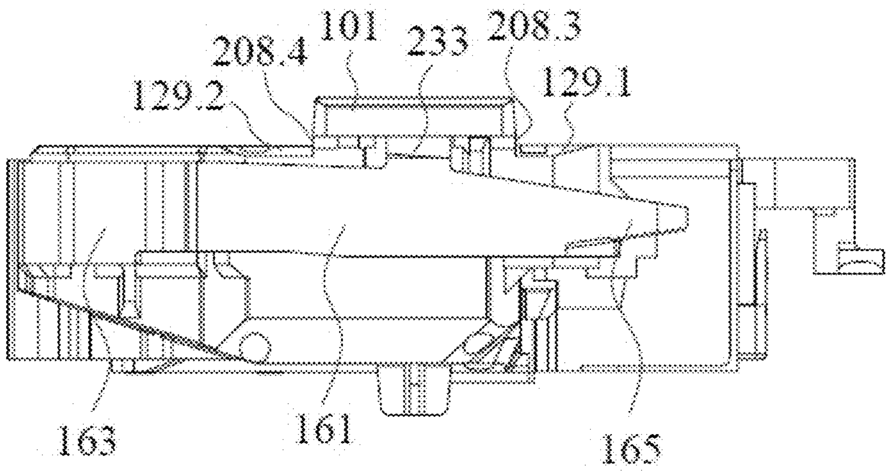
FIG. 2 is a left view of the door lock 100 in FIG. 1.
Figure 3:
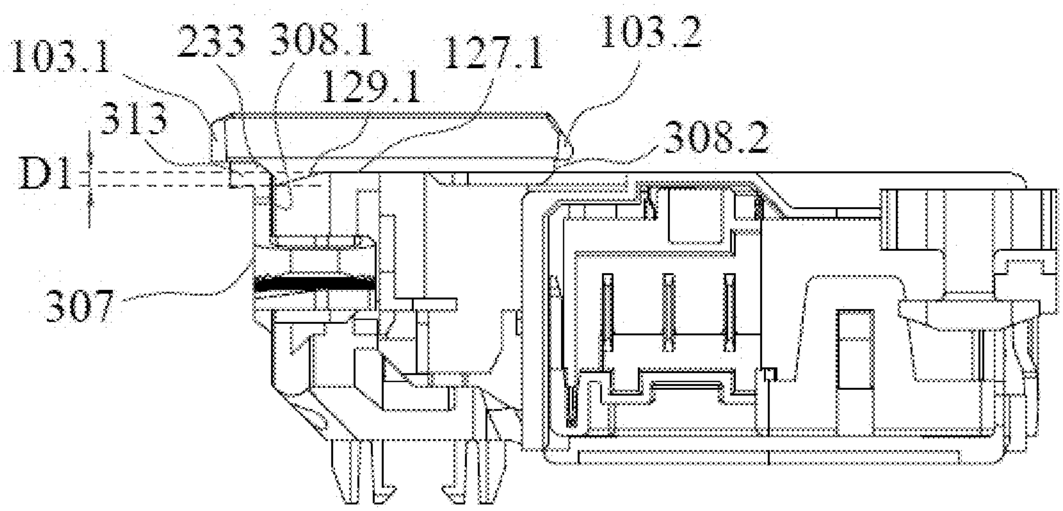
FIG. 3 is a front view of the door lock 100 in FIG. 1.

As shown in FIG. 1, the door lock 100 includes a housing 130 located in its upper part and a base 110 located in the lower part of the housing 130 and engaged therewith. The housing 130 on the left side of the door lock 100 is provided with a door hook hole body 101, and the door hook hole body 101 is provided with a door hook hole 102 for receiving a lock hook (not shown) on a door of an electrical device. As an example, the door hook hole body 101 is rectangular, and in other examples, the door hook hole body 101 may also be of other shapes such as a square. The door hook hole body 101 has a top 109, and the lower part of the top 109 extending downward forms a first pair of sidewalls including a left sidewall and a right sidewall and a second pair of sidewalls including a front sidewall and a rear sidewall. As blocked by the door hook hole body 101, the left sidewall and the right sidewall are not shown in FIG. 1, and their specific structures are illustrated in FIG. 3, see 308.1 and 308.2 in FIG. 3 for reference. Likewise, the front sidewall and the rear sidewall are not shown in FIG. 1 either, and their specific structures are illustrated in FIG. 2, see 208.3 and 208.4 in FIG. 2 for reference. A pair of oppositely provided clamping edges 103.1 and 103.2 (left clamping edge or first clamping edge 103.1; right clamping edge or second clamping edge 103.2) extend outward respectively from the left sidewall (see 308.1 in FIG. 3) and the right sidewall (see 308.2 in FIG. 3) on the top 109 symmetrical about its width direction (or a left-right direction). According to an embodiment of the present application, the door lock 100 can be installed in an installation hole 952 on a panel 950 of the electrical device through the clamping edges 103.1 and 103.2 on the door hook hole body 101 (see FIGS. 11A and 11B).

As shown in FIG. 1, a cantilever 161 is provided on the left side of the housing 130. The cantilever 161 is provided on the base 110, and extends forward in the width direction of the housing 130 from the left side of the rear part of the housing 130, such that the cantilever 161 is located substantially on the outer side of the left sidewall (i.e., the first sidewall, see 308.1 in FIG. 3) of the door hook hole body 101, and below the first clamping edge 103.1. A distal end 165 (i.e., front end 165) of the cantilever 161 is a free end. As an example, the cantilever 161 is made of an elastic material (e.g., plastic), such that the cantilever 161 has a certain degree of elasticity, and can be elastically deformed. Therefore, when the distal end 165 of the cantilever 161 is subjected to a force, the cantilever 161 can be deformed to move up and down.

As shown in FIG. 1 as well as dashed boxes 151 and 152, the housing 130 is provided with two pairs of contact faces respectively on front and rear sides of the door hook hole body 101, and the two pairs of contact faces are successively in contact with the installation panel 950 during installation. Specifically, a first contact face 127.1, a second contact face 129.1 and a supporting part 128.1 are provided on the front side of the front sidewall (see 208.3 in FIG. 2), and likewise, a first contact face 127.2, a second contact face 129.2 and a supporting part 128.2 are provided on the rear side of the rear sidewall (see 208.4 in FIG. 2). The second contact face 129.1 is formed by the left end (i.e., distal end) of the first contact face 127.1 extending obliquely downward, and similarly, the second contact face 129.2 is formed by the left end (i.e., distal end) of the first contact face 127.2 extending obliquely downward. In one embodiment of the present application, the supporting part 128.1 is formed at the junction of the second contact face 129.1 and the first contact face 127.1, and the supporting part 128.2 is formed at the junction of the second contact face 129.2 and the first contact face 127.2. In an embodiment shown in the present application, the first contact faces 127.1 and 127.2 are also the upper surface of the housing 130, and thus the supporting part 128.1 and the supporting part 128.2 have the same longitudinal height (i.e., along the up-down direction). As an example, the second contact faces 129.1 and 129.2 are sloped and have the same sloping angle, such that they can be used together for contact with the installation panel 950. In the embodiment shown in FIG. 1, an angle α is formed between the extended faces of the second contact face 129.1 and the first contact face 127.1 (i.e., the sloping angle of the second contact face 129.1), and likewise, the second contact face 129.2 also has the same sloping angle α, where α is an acute angle. As an example, α is approximately 15°. In other embodiments, the supporting parts may also be of other structures, with the proximal end of the first contact face and the distal end of the second contact face connected to the supporting parts, respectively.

Figure 9A:
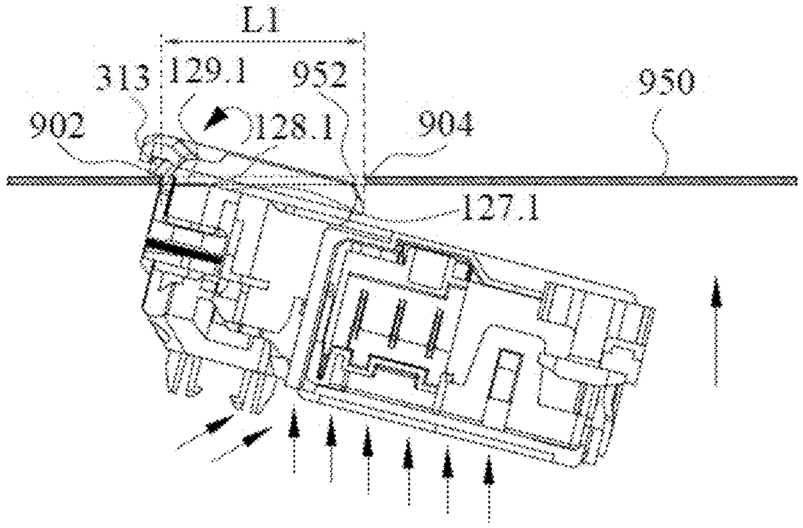
FIGS. 9A-9C illustrate a process for installing the door lock 100 to the installation panel 950 of the electrical device.
Figure 9B:
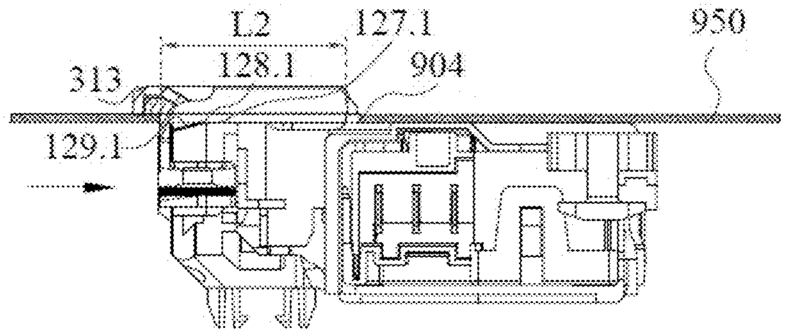

During installation, after the left clamping edge 103.1 of the door hook hole body 101 passes through the installation hole 952 on the installation panel 950, the pair of second contact faces 129.1 and 129.2 are first brought into contact with the installation panel 950 (see FIG. 9A), and then the door lock 100 is rotated around the supporting parts 128.1 and 128.2, at which time the pair of second contact faces 129.1 and 129.2 leave the installation panel 950, while the pair of first contact faces 127.1 and 127.2 come into contact with the installation panel 950 (see FIG. 9B).

Those skilled in the art will understand that the pair of second contact faces 129.1 and 129.2 may also be formed by the left ends of the pair of first contact faces 127.1 and 127.2 extending obliquely with respect to a vertical direction. Alternatively in other embodiments, the pair of second contact faces 129.1 and 129.2 may be curved faces or the like rather than sloped faces. It should be noted that in these cases, the pair of second contact faces 129.1 and 129.2 may not be in contact with the installation panel 950 during installation, as long as the door lock 100 is enabled to rotate around the supporting parts 128.1 and 128.2, and upon rotation, the pair of first contact faces 127.1 and 127.2 can be brought into contact with the installation panel 950.

FIG. 2 is a left view of the door lock 100 in FIG. 1, showing the relative positional relationship of the door hook hole body 101, the cantilever 161, and a lock head 233.

As shown in FIG. 2, the door lock 100 further includes a lock head 233. The lock head 233 is provided on the cantilever 161 and is positioned below the left clamping edge 103.1 of the door hook hole body 101. In the process of installing the door lock 100 to the installation panel, when the lock head 233 moves up and down in a substantially upright direction (i.e., a direction perpendicular to the body of the door lock 100), the cantilever 161 can be elastically deformed or restored. In this embodiment, the cantilever 161 has a proximal end 163 (i.e., rear end 163) and a distal end 165 (i.e., front end 165), the lock head 233 is connected to an upper part of the cantilever 161 on the side adjacent to the distal end 165, and it is relatively easy to produce elastic deformation in this part. Specifically, when the lock head 233 moves upward under the action of an external force and moves into a groove 531 (see FIG. 5) on the lower surface of the left clamping edge 103.1, the cantilever 161 will undergo an upward elastic deformation, so the cantilever 161 bears a downward elastic restoring force; when the external force is removed, the lock head 233 moves downward under the action of the elastic restoring force to move out of the groove 531 (see FIG. 5) on the lower surface of the left clamping edge 103.1, and the cantilever 161 is restored to the position shown in FIG. 2.

FIG. 3 is a front view of the door lock 100 in FIG. 1, showing the specific structures of the lock head 233 and the door hook hole body 101. As shown in FIG. 3, the lock head 233 has a hook edge 313 protruding to the left side of an outer sidewall 307 of the cantilever 161. As an example, when the door lock 100 is horizontally placed with respect to the installation panel 950, the top surface of the housing 130 (i.e., the pair of first contact faces 127.1 and 127.2) maintains a horizontal position, the lower surface of the hook edge 313 is below the top surface of the housing 130 (i.e., y the pair of first contact faces 127.1 and 127.2) and in a vertical direction, and there is a distance D1 between the hook edge 313 and the top surface of the housing 130.

While the door lock 100 is sloped at an angle α (i.e., the sloping angle of the pair of second contact faces 129.1 and 129.2) with respect to the installation panel 950, the pair of second contact faces 129.1 and 129.2 are in a horizontal position with respect to the installation panel 950, at which time the lower surface of the hook edge 313 is above the pair of second contact faces 129.1 and 129.2 and in a vertical direction, and the distance between the hook edge 313 and the pair of second contact faces 129.1 and 129.2 is the thickness of the installation panel 950 (see FIG. 9A). Thus, while the lock head 233 has not yet moved upward, the lock head 233 is capable of catching the upper surface of the left rim 902 of the installation hole 952, at which time the pair of second contact faces 129.1 and 129.2 are in contact with the lower surface of the installation panel 950 (see still FIG. 9A).

As still shown in FIG. 3, the door hook hole body 101 has the left sidewall 308.1 and the right sidewall 308.2, with the clamping edge 103.1 extending outward from the left sidewall 308.1, and the clamping edge 103.2 extending outward from the right sidewall 308.2. As an example, the left sidewall 308.1 of the door hook hole body 101 is the left surface of the housing 130. The pair of second contact faces 129.1 and 129.2 extend obliquely from the pair of first contact faces 127.1 and 127.2 to the left sidewall 308.1, respectively.

Figure 4:
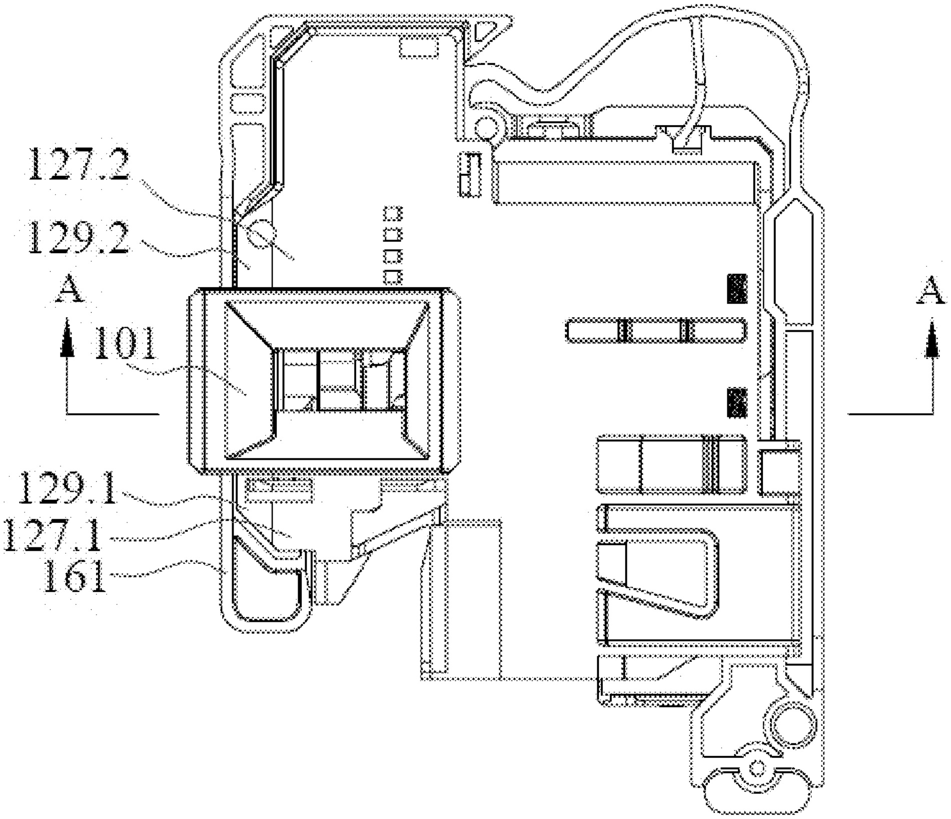
FIG. 4 is a top view of the door lock 100 in FIG. 1.

FIG. 4 is a top view of the door lock 100 in FIG. 1, showing more clearly the relative positions of the door hook hole body 101, the pair of first contact faces 127.1 and 127.2, and the pair of second contact faces 129.1 and 129.2. As shown in FIG. 4, the first contact face 127.1 and the second contact face 129.1 are provided on the housing on the front side of the door hook hole body 101, and the first contact face 127.1 is provided on the left side of the second contact face 129.1. The first contact face 127.2 and the second contact face 129.2 are provided on the housing on the rear side of the door hook hole body 101, and the first contact face 127.2 is provided on the left side of the second contact face 129.2.

Figure 5:
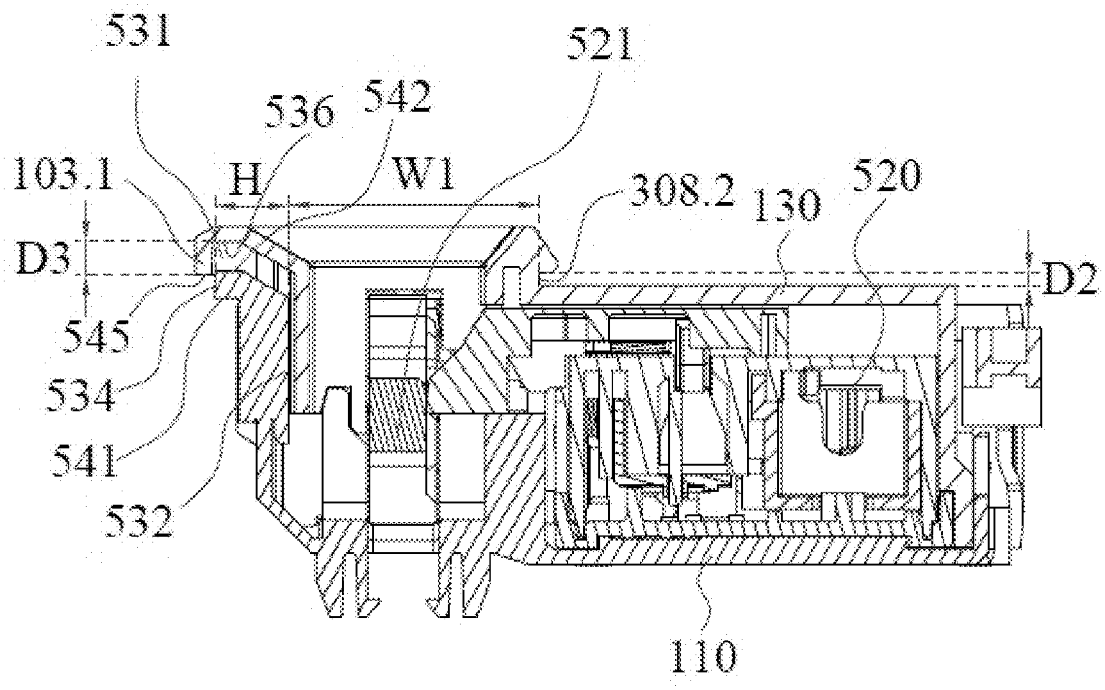
FIG. 5 is a sectional view of the door lock 100 along line A-A in FIG. 4.

FIG. 5 is a sectional view of the door lock 100 along line A-A in FIG. 4, showing more specific structures of the door hook hole body 101 and the lock head 233, as well as the mating relationship therebetween. As shown in FIG. 5, the groove 531 is provided on the back of the top (or the lower surface) of the left clamping edge 103.1 for accommodating the lock head 233, wherein the width H of the groove 531 matches the width of the lock head 233, and the height of the hook edge 313 of the lock head 233 (i.e., the distance between the upper surface 542 and the lower surface 541 of the hook edge 313) also matches the depth of the groove 531 (i.e., the distance between the groove bottom 536 of the groove 531 and the lower surface 545 of the left clamping edge 103.1), such that the lock head 233 can be accommodated in the groove 531, and when the lock head 233 moves up and down, the hook edge 313 can move into or out of the groove 531. As an example, the width of the lock head 233 is the same as or slightly less than the width H of the groove 531, and the height of the hook edge 313 of the lock head 233 is also the same as or slightly less than the depth of the groove 531. In the example as shown in FIG. 5, the depth of the groove 531 is D3, and the height of the hook edge 313 of the lock head 233 is also D3, such that when the lock head 233 moves into the groove 531, the lower surface 541 of the hook edge 313 can be almost flush with the lower surface 545 of the left clamping edge 103.1.

As shown in FIG. 5, an accommodating cavity is formed between the mutually engaged housing 130 and base 110 for accommodating the parts of the door lock, wherein an execution part for locking and releasing the door of the electrical device, including a cam 521, is accommodated in the accommodating cavity formed by the base 110 of the housing 130 at the proximal end (i.e., on the left side). When the lock hook (not shown) installed on the door of the electrical device is inserted into the door hook hole body 101, the cam 521 can lock the lock hook, such that the door of the electrical device (not shown) is locked on the installation panel 950 of the electrical device. A control component (e.g., a switch box 520) that controls the execution part is accommodated in the accommodating cavity formed by the base 110 of the housing 130 at the distal end (i.e., on the right side), and will not be described in detail herein.

As still shown in FIG. 5, there is a predetermined distance D2 between the lower surface of the second clamping edge 103.2 of the door book hole body 101 and the top surface of the housing (i.e., the first contact faces 127.1 and 127.2), and the predetermined distance D2 matches the thickness of the installation panel 950. After completion of installation, the first contact faces 127.1 and 127.2 can come into contact with the lower surface of the installation panel 950, and the lower surface of the second clamping edge 103.2 can come into contact with the upper surface of the installation panel 950. Thus after completion of installation, the door lock 100 cannot move up and down on the installation panel 950.

An inner sidewall 532 (i.e., the inner sidewall 532 of a slider 820 in FIG. 8A) is connected on the right side of the lock head 233, the distance between the inner sidewall 532 and the right sidewall 308.2 of the door hook hole body 101 is W1, and the distance between the outer sidewall 534 of the lock head 233 (i.e., the left surface of the lock head 233) and the right sidewall 308.2 of the door hook hole body 101 is H+W1. As H+W1 is the length L3 of the installation hole 952 (or slightly less than the length of the installation hole 952), the combined action of the door hook hole body 101 and the lock head 233 causes the outer sidewall 534 of the hook edge 313 and the right sidewall 308.2 of the door hook hole body 101 to respectively abut against the two rims 902 and 904 of the installation hole 952 after the door hook hole body 101 and the lock head 233 are inserted into the installation hole 952, such that the clamping edges 103.1 and 103.2 on the door hook hole body 101 cannot exit the installation hole 952, and the door lock 100 cannot move left and right on the installation panel 950, thereby securing the door lock 100 to the panel 950 (see FIG. 9C).

Figure 6:
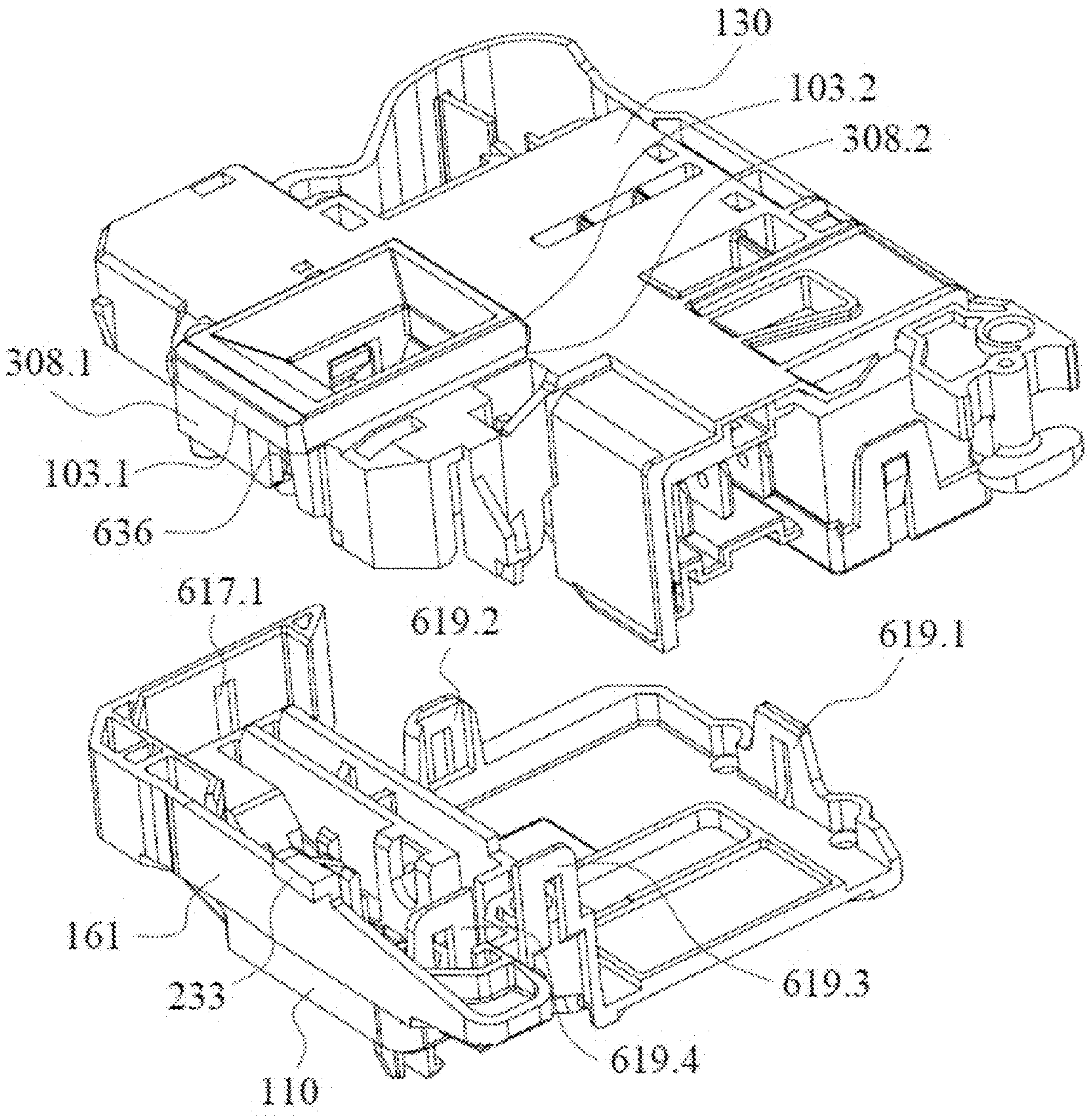
FIG. 6 is an exploded three-dimensional structural view of the door lock 100 in FIG. 1.

FIG. 6 is an exploded three-dimensional structural view of the door lock 100 in FIG. 1, with the housing 130 and the base 110 separated for showing more specific structures of the housing 130 and the base 110 and illustrating the mating parts on the housing 130 and the base 110.

As shown in FIG. 6, the housing 130 and the base 110 are detachably connected together by a snap-fit structure. As an example, the base 110 is provided with snaps 619.1, 619.2, 619.3 and 619.4 as well as a snap hole 617.1, and the housing 130 is provided with corresponding snap holes or snap-fit structure (not shown in FIGS.). When the base 110 is inserted from the lower part of the housing 130, the corresponding snaps and snap holes mate each other to connect the base 110 to the lower part of the housing 130.

The left sidewall 308.1 of the door hook hole body 101 is provided with a guiding slot 636 for guiding the lock head 233 to move into or out of the groove 531. As an example, the guiding slot 636 is formed by the left sidewall 308.1 recessing inward (i.e., in a direction toward the right sidewall 308.2). The guiding slot 636 is capable of mating with sliding slots 815.1 and 815.2 extending longitudinally (i.e., extending in an up and down direction) on the slider 820 on the cantilever 161 (see FIG. 8A), thereby guiding the lock head 233 to move up and down in the guiding slot 636, such that the lock head 233 can move into or out of the groove 531.

Figure 7:
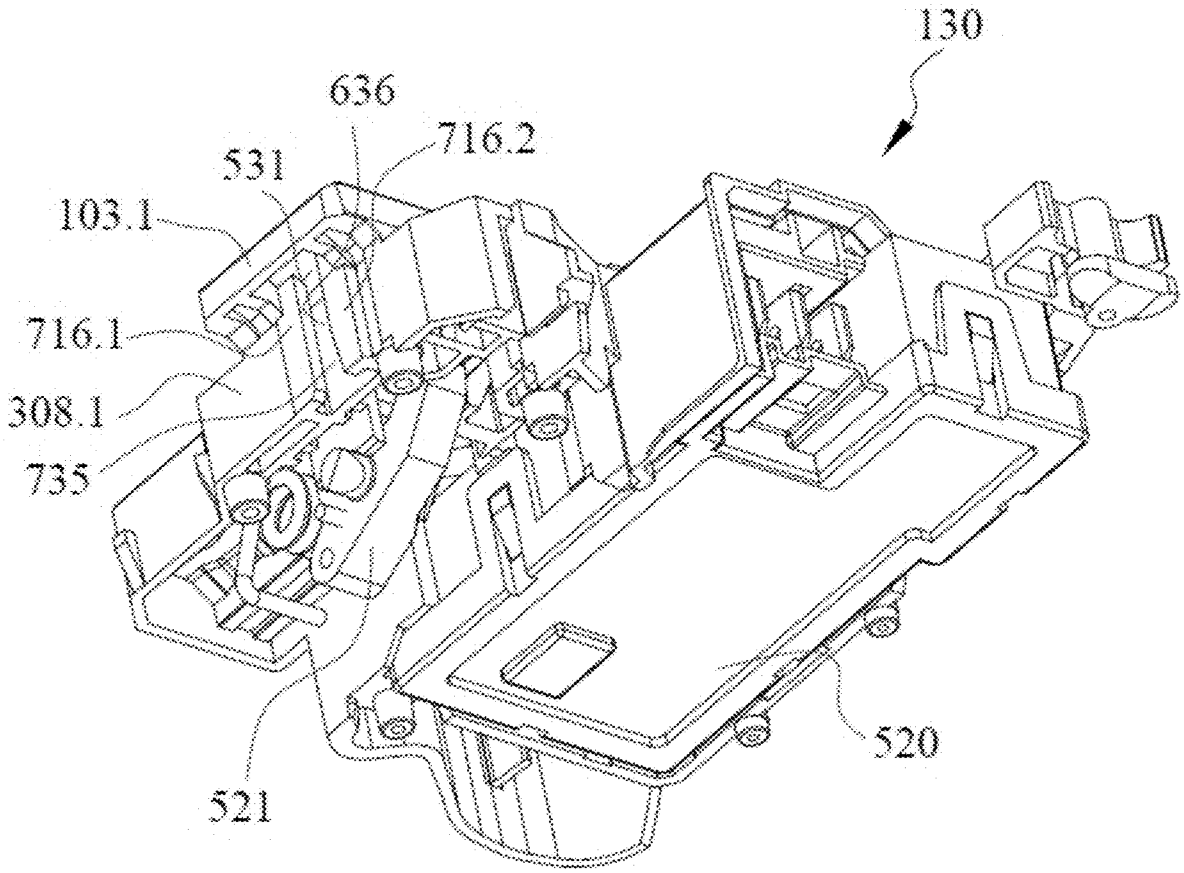
FIG. 7 is a schematic three-dimensional structural view of the housing 130 from another perspective.

FIG. 7 is a schematic three-dimensional structural view of the housing 130 shown in FIG. 6 from a bottom view, further showing more structural details of the door hook hole body 101.

As shown in FIG. 7, the guiding slot 636 has a slot bottom 735, and the left sidewall 308.1 of the two opposite sides of the guiding slot 636 is provided with guide rails 716.1 and 716.2 extending longitudinally (i.e., extending in an up and down direction), wherein the guide rails 716.1 and 716.2 are spaced at a certain distance, such that the slider 820 on the cantilever 161 (see FIG. 8A) can be inserted into the guiding slot 636 to mate with the guide rails 716.1 and 716.2 and slide. In the embodiment as shown in FIG. 7, the guiding slot 636 is in communication with the groove 531. Moreover, the guide rails 716.1 and 716.2 extend upward into the groove 531, such that when the slider 820 connected to the cantilever 161 mates with the guide rails 716.1 and 716.2 and slides along the guide rails 716.1 and 716.2, there is a certain sliding distance.

As shown in FIG. 7, a cam 521 is further included below the door hook hole body 101 within the housing 130, and the cam 521 is rotatable.

Figure 8A:
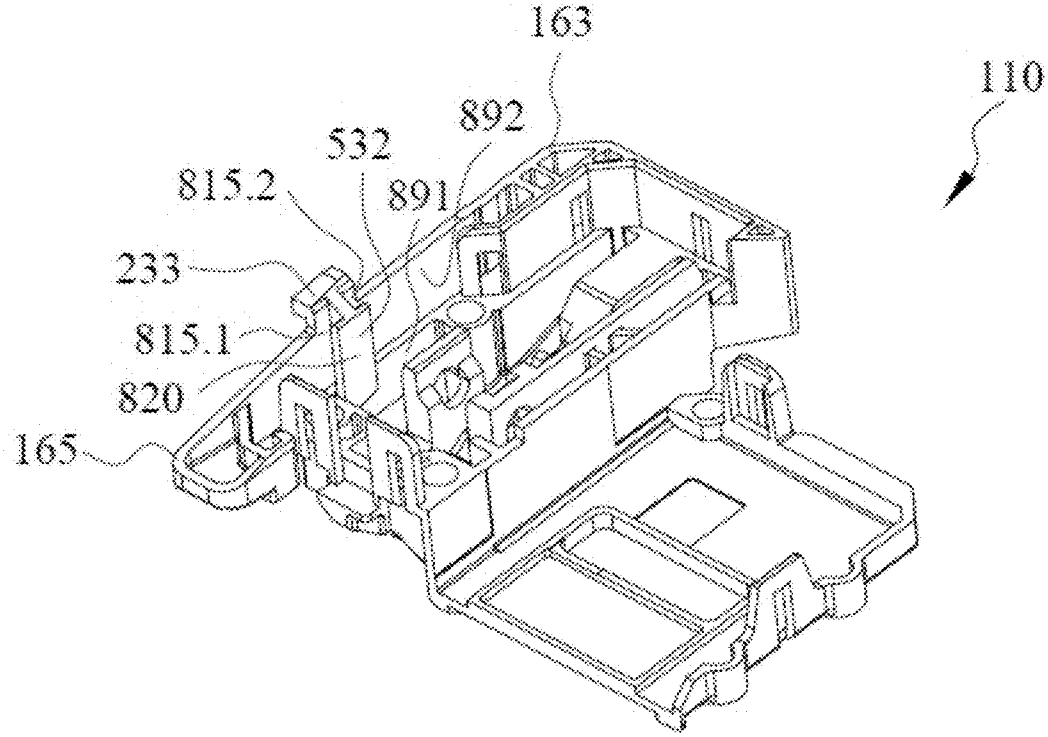
FIGS. 8A and 8B are schematic three-dimensional structural views of the base 110 from two different perspectives.
Figure 8B:
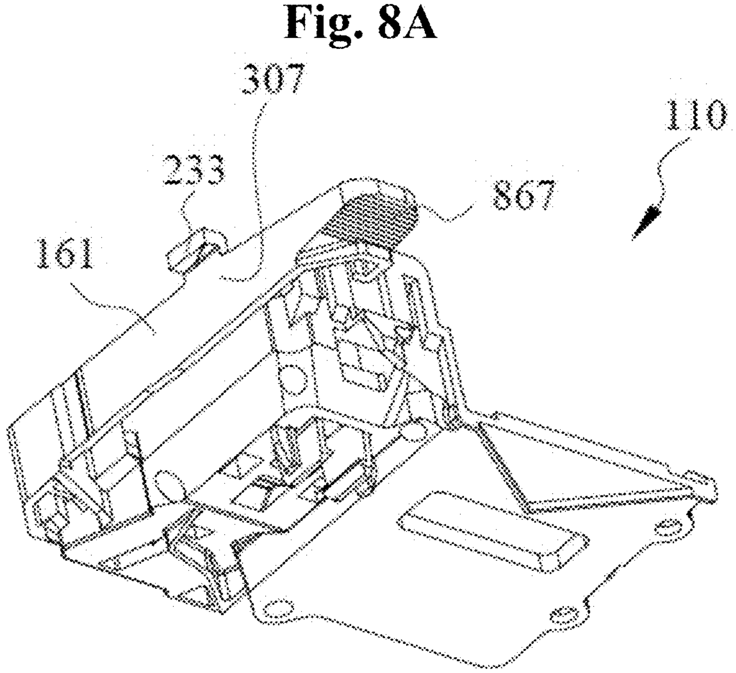

FIGS. 8A and 8B are schematic three-dimensional structural views of the base 110 from two different perspectives, showing more structural details on the cantilever 161. FIG. 8A shows the specific structure of the base 110 when viewed from the top down, and FIG. 8B shows the specific structure of the base 110 when viewed from the bottom up.

As shown in FIGS. 8A and 8B, the cantilever 161 is provided on the lateral side of the base 110, the proximal end 163 (rear end) of the cantilever 161 is connected to the rear side of the base 110, and the distal end 165 (front end) is not connected to the base 110, forming a free end. The cantilever 161 is formed by extending the proximal end 163 (rear end) outside the outer sidewall 891 of the base 110 to the distal end 165 (front end), and takes a bend inwardly at the distal end 165 (front end) to form an operating part 867. The cantilever 161 has an inner sidewall 892 and an outer sidewall 307. The lock head 233 is provided above the cantilever 161, and the inner sidewall 892 is provided with the slider 820 for mating with the guiding slot 636 on the housing 130 and sliding along the guiding slot 636 to drive the lock head 233 moving. As an example, the slider 820 is connected to the inner side of the lock head 233 (i.e., the right side of the lock head 233 in FIG. 8A), such that the structure on the cantilever 161 is more compact.

The slider 820 has the sliding slots 815.1 and 815.2 extending longitudinally respectively on two sides of the slider 820, such that the middle part of the slider 820 forms a ridge portion, wherein the slider 820 can be accommodated in the guiding slot 636, while the guide rails 716.1 and 716.2 on the outer side of the guiding slot 636 can be accommodated in the sliding slot 815.1 and 815.2, such that the slider 820 and the guiding slot 636 can slide with respect to one another, thereby guiding the lock head 233 to move up and down. When the sliding slots 815.1 and 815.2 on the slider 820 mates with the guide rails 716.1 and 716.2 on the guiding slot 636 and slides along the guide rails 716.1 and 716.2, the inner sidewall 532 of the slider 820 attaches immediately against the slot bottom of the guiding slot 636.

Of course, the slider 820 may be provided at other part on the cantilever 161 rather than connected to the back of the lock head 233, and the guiding slot 636, and the guide rails 716.1 and 716.2 may be provided at other corresponding parts on the housing 130.

As an example, when the door lock 100 is detached from the installation panel 950, an operator can uplift the operating part 867, such that the distal end 165 of the cantilever 161 moves upward, driving the lock head 233 to move into the groove 531, and leaving a certain space at the left rim 902 of the installation panel 950, such that the door lock 100 can move to the left, whereby the door lock 100 can be detached after being slanted (see FIG. 9B).

Figure 9C:
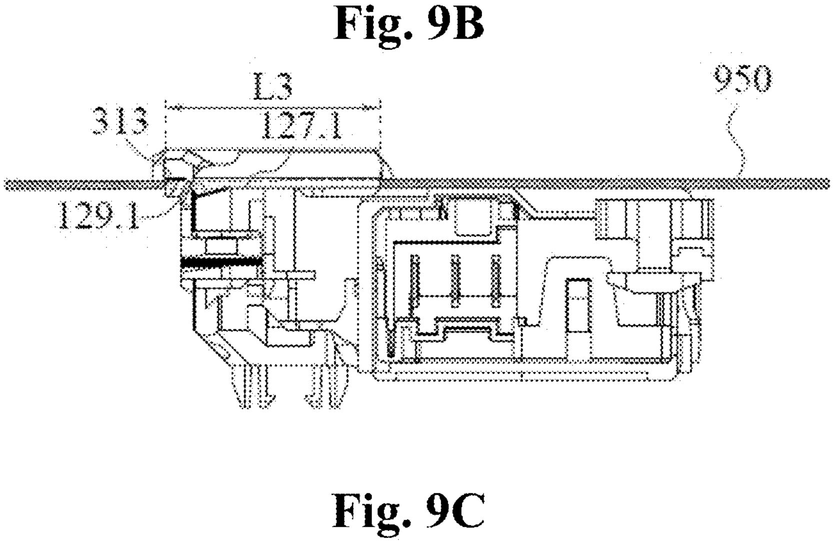

FIGS. 9A-9C illustrate a process for installing the door lock 100 into the installation hole 952 of the installation panel 950 of the electrical device, in which: FIG. 9A shows the relative positions of the door lock 100 and the installation panel 950 when the second contact face 129.1 comes into contact with the installation panel 950 while the lock head 233 is hanging on the left rim 902 of the installation hole 952; FIG. 9B shows the relative positions of the door lock 100 and the installation panel 950 when the first contact face 127.1 comes into contact with the installation panel 950 while the door hook hole body 101 is rotating around the supporting part 128.1; and FIG. 9C shows the relative positions of the door lock 100 and the installation panel 950 when the door hook hole body 101 moves toward the right rim 904 of the installation hole 952.

As shown in FIG. 9A, firstly, the operator aligns the door hook hole body 101 with the installation hole 952 on the installation panel 950, and then slants the door lock 100 by a certain angle to extend the left clamping edge 103.1 on the door hook hole body 101 through the installation hole 952 first, and hangs the lock head 233 on the left rim 902, with the hook edge 313 of the lock head 233 being capable of abutting against the upper surface of the left rim 902. However, the cantilever 161 and the lock head 233 are not subjected to external forces, and the lock head 233 is located outside the groove 531, spaced from the slot bottom 536 of the groove 531 by a distance. At this time, the pair of second contact faces 129.1 and 129.2 respectively on the front and rear sides of the door hook hole body 101 come into contact with the lower surfaces of the installation panel 950 on the front and rear sides of the installation hole 952, respectively, while the pair of first contact faces 127.1 and 127.2 are not in contact with the installation panel 950, and the sloping angle of the door lock 100 is the sloping angle $\alpha$ of the second contact faces 129.1 and 129.2.

Thus, as the door lock 100 is slanted at a certain angle, the hook edge 313 comes into contact with the upper surface of the installation panel 950, while the pair of second contact faces 129.1 and 129.2 come into contact with the lower surface of the installation panel 950.

At this time, the length over which an action on the installation hole 952 on the installation panel 950 occurs is a length L1 of a projection of the distance between the left sidewall of the lock head 233 (i.e., the outer sidewall 307 of the cantilever 161) and the right clamping edge 103.2 of the door hook hole body 101 on the installation panel 950, at which time the projection length L1 is sufficiently less than the length L3 of the installation hole 952, so the right clamping edge 103.2 on the door hook hole body 101 can enter or exit the installation hole 952.

When the operator applies upward forces to the portions of the door lock 100 on the right sides of the supporting parts 128.1 and 128.2, the door lock 100 rotates counterclockwisely with the supporting parts 128.1 and 128.2 as fulcrums, such that the right clamping edge 103.2 on the door hook hole body 101 can pass through the installation hole 952. It should be noted that the acting force applied to the door lock 100 does not need to be limited by a specific force application position, and the acting force applied may not be vertically upward, as long as the acting force has an upward component, so that the acting force can still be applied easily in a narrow space.

As shown in FIG. 9B, when the door lock 100 rotates counterclockwisely with the supporting parts 128.1 and 128.2 as fulcrums, the left clamping edge 103.1 of the door hook hole body 101 moves downward toward the installation panel 950, and the right clamping edge 103.2 moves upward to pass through the right rim 904 of the installation hole 952, until the pair of second contact faces 129.1 and 129.2 leave the installation panel 950, while the pair of first contact faces 127.1 and 127.2 come into contact with the lower surface of the installation panel 950. At this time, the lower surface 541 of the hook edge 313 of the lock head 233 presses against the upper surface of the left rim 902 of the installation panel 950, such that the lock head 233 is subjected to an upward reaction force, and the lock head 233 moves upward with respect to the door hook hole body 101, thereby moving the lock head 233 into the groove 531. At this time, the cantilever 161 is elastically deformed, the cantilever 161 has a downward elastic restoring force, and the lock head 233 has a tendency to move downward to move out of the groove 531.

At this time, the length over which an action on the installation hole 952 on the panel 950 occurs is the distance between the outer sidewall 307 of the cantilever 161 and the right sidewall 308.2 of the door hook hole body 101, i.e., a second distance L2. At this time, the second distance L2 is sufficiently less than the length L3 of the installation hole 952, so the left clamping edge 103.1, the right clamping edge 103.2 on the door hook hole body 101 and the lock head 233 can enter or exit the installation hole 952.

When an operator applies a rightward pushing force to the left side of the door lock 100, the door lock 100 moves from the position of FIG. 9B to the position of FIG. 9C.

As shown in FIG. 9C, when the operator moves the door lock 100 to the right, the right sidewall 308.2 of the door hook hole body 101 abuts against the right rim 904 of the installation hole 952, such that the right clamping edge 103.2 is clamped on the right rim 904, during which the pair of first contact faces 127.1 and 127.2 are still held in contact with the lower surface of the installation panel 950. At this time, the lower surface 541 of the hook edge 313 of the lock head 233 is no longer pressed against the installation panel 950, that is, no longer subjected to the force acted by the installation panel 950. At this time, the elastic restoring force of the cantilever 161 drives the lock head 233 to move downward and out of the groove 531. At the same time, a clicking sound is made, such that the operator knows that the installation is done in place.

After completion of installation, the distance between the outer sidewall 534 of the lock head 233 (i.e., the left surface of the lock head 233) and the right sidewall 308.2 of the door hook hole body 101 is H+W1, which is exactly the length L3 of the installation hole 952 (or slightly less than the length of the installation hole 952), such that the door lock 100 cannot move in the length direction of the installation hole 952. The width of the door hook hole body 101 is the same as the width of the installation hole 952, so the door lock 100 cannot move in the width direction of the installation hole 952 either. Moreover, the clamping edges 103.1 and 103.2 on the door hook hole body 101 are above the installation hole 952, and the distance between the outer walls thereof is larger than the length of the installation hole 952, thus the door lock 100 cannot move in the up-down direction of the installation hole 952, and cannot come out of the installation hole 952. Therefore, the door lock 100 cannot move in the left-right direction, front-rear direction and up-down direction of the installation hole 952, that is, it is fastened within the c.

Figure 10A:
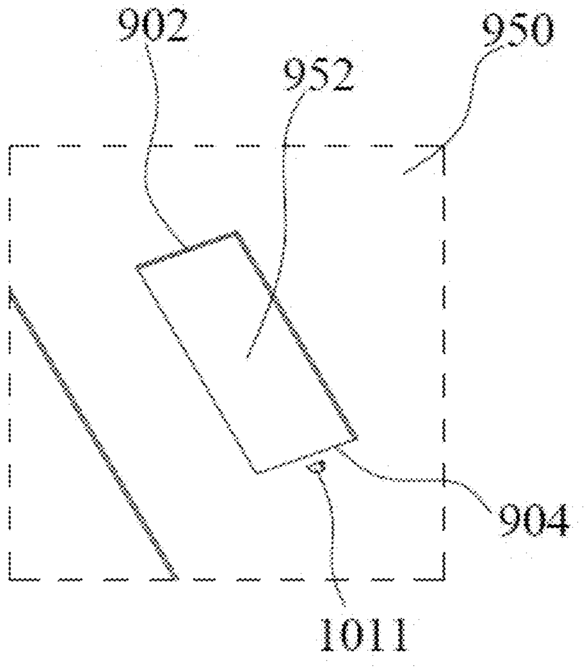
FIGS. 10A-10B are schematic structural views of two embodiments of the installation hole 952 on the installation panel 950.
Figure 10B:
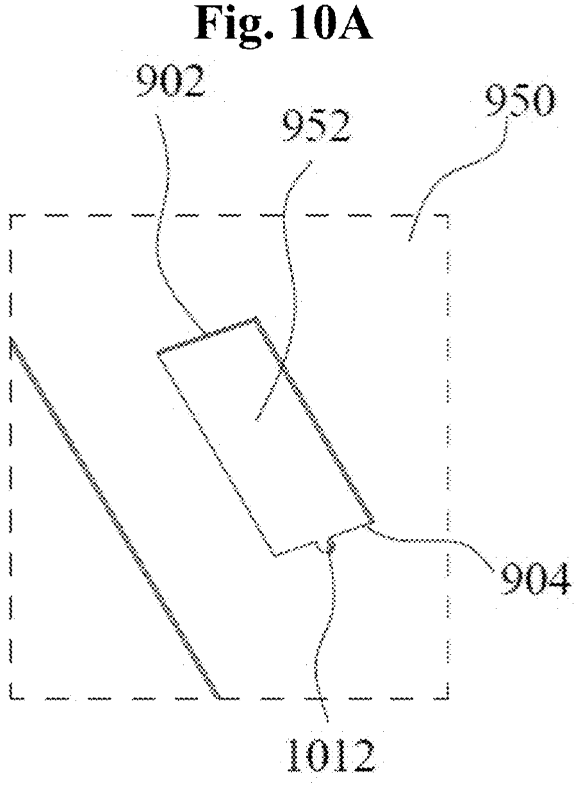

FIGS. 10A-10B are schematic structural views of two embodiments of the installation holes 952 on the installation panel 950. As can be seen from the state shown in FIG. 9C, when the door lock 100 is completely secured within the installation hole 952, the right clamping edge 103.2 is always clamped on the right rim 904 of the installation hole 952, and as the right clamping edge 903.2 has a certain span, it will cover a section of the right rim 904.

Therefore, in the embodiment as shown in FIG. 10A, for convenience of showing whether the door lock 100 is completely fastened within the installation hole 952, the applicant sets an indicator hole 1011 on the right rim 904 of the installation hole 952. When the door lock 100 is completely fastened within the installation hole 952, the indicator hole 1011 will be covered by the right clamping edge 103.2 and cannot be seen by naked eyes. On the contrary, when the door lock 100 is not properly or completely installed on the installation hole 952, the indicator hole 1011 is visible to naked eyes. Therefore, the indicator hole 1011 can indicate the installation state of the door lock 100.

In the embodiment as shown in FIG. 10B, the indicator hole 1011 is provided as an indicator slot 1012. The indicator hole 1011 and the installation hole 952 are not in communication, while the indicator slot 1012 is in communication with the installation hole 952.

In fact, the indicator hole 1011 and the indicator slot 1012 may have a variety of alternatives, such as drawing indicative areas of different colors with paints or pigments, or otherwise marked indicative marks or traces. Such indicative marks have the same function, that is, when the door lock 100 is properly and completely installed, the indicative mark is covered by the right clamping edge 103.2.

Figure 11A:
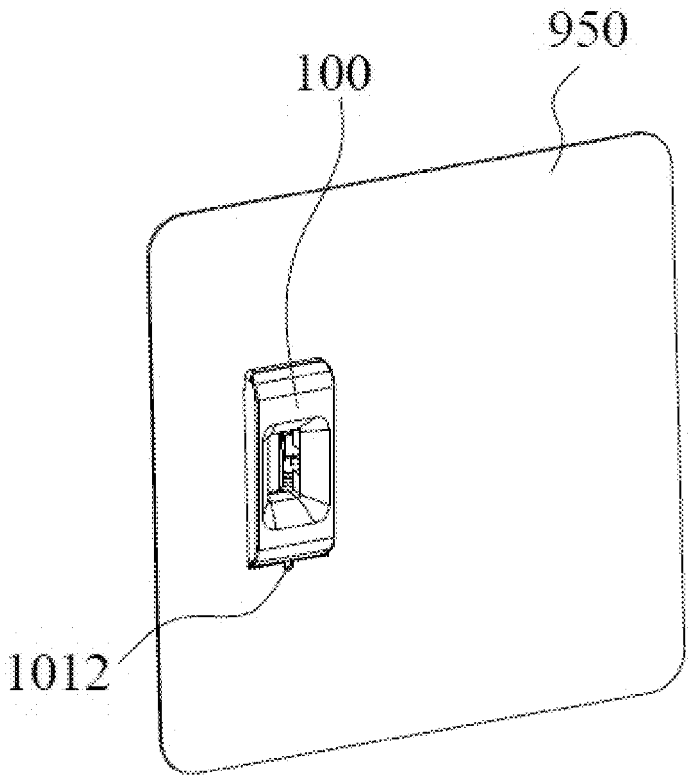
FIGS. 11A-11B are schematic views showing state of the installation hole 952 in the process of installing the door lock 100 to the installation panel 950.
Figure 11B:
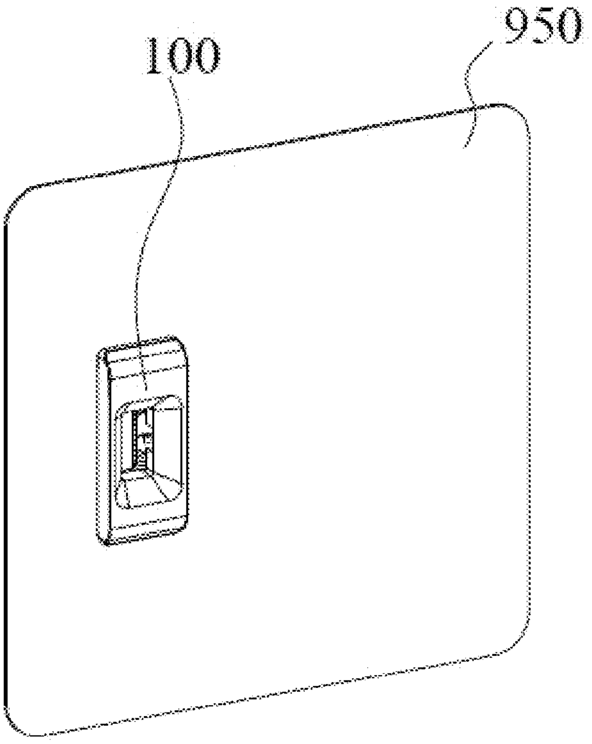

FIGS. 11A-11B are schematic views showing state of the installation hole 952 in the process of installing the door lock 100 to the installation panel 950. As FIG. 11A is shown in the state as shown in FIG. 9B, the right clamping edge 103.2 has not yet been pushed to the right rim 904 for clamping the installation hole 952, at which time the lock head 233 moves into the groove 531, the door lock 100 is still in a loose state and can be taken out of the installation hole 952. At this time, the indicator slot 1012 (the same for the indicator hole 1011) is visible to naked eyes, indicating that the door lock 100 is not completely in place or properly installed.

As FIG. 11B is shown in the state as shown in FIG. 9C, at which time the door lock 100 is moved downward (move right in FIG. 9C), and the lower surface 541 of the hook edge 313 of the lock head 233 is no longer pressed against the installation panel 950. The elastic restoring force of the cantilever 161 drives the lock head 233 to move downward and out of the groove 531, and the door lock 100 is fastened in the installation hole 952. Without uplifting the operating part 867 of the cantilever 161 and moving the lock head 233 into the groove 531, the door lock 100 cannot be taken out in front of the installation panel 950. At this time, the indicator slot 1012 is covered by the right clamping edge 103.2 and cannot be seen by naked eyes, indicating that the door lock 100 has been completely or properly installed in the installation hole 952.

When the space of the installation panel 950 on the side where the door lock 100 is installed is narrow, the operator can apply pressure at any sites of the door lock 100 on the right side of the supporting parts, such that the door lock 100 can rotate around the supporting parts, and come into contact with the installation panel 950 through the first contact face and the second contact face respectively, such that the lock head 233 moves into or out of the groove 531, and then the door hook hole body 101 of the door lock 100 is installed on the installation panel 950. Moreover, the operator can uplift operating part 867 to facilitate the detachment of the door lock. According to the present application, it is simpler and easier for the operator to install the door lock, and it is more suitable for the operator to install the door lock in the case of a narrow space.

Although the present application is described with reference to the specific embodiments shown in the drawings, it should be understood that the door lock structures in the embodiments of the present application may have many variations without departing from the spirit and scope and background of the teachings of the present application. One of ordinary skill in the art will recognize that there are different ways to change the structures of the embodiments disclosed in the present application, all falling within the spirit of the present application and the scope of the claims.

The invention claimed is:

1. A door lock, comprising:

a housing;

a door hook hole body provided on the housing, wherein the door hook hole body comprises a top, a first pair of oppositely provided sidewalls, and a second pair of oppositely provided sidewalls, and the first pair of oppositely provided sidewalls and the second pair of oppositely provided sidewalls are formed respectively by extending downward from a lower part of the top;

a pair of clamping edges comprising a first clamping edge and a second clamping edge, the pair of clamping edges extending outward respectively from the first pair of oppositely provided sidewalls from the top of the door hook hole body;

a groove formed by a recess extending into a u-shaped arrangement defined by the first clamping edge, and intersecting segments of a respective one of the door hook hole body sidewalls that are connected to the first clamping edge;

a lock head provided below the groove, wherein the lock head is capable of moving into or out of the groove respectively defining a retracted state and an extended state, wherein the lock head defines the extended state out of the groove by default when not subjected to an external force and defines the retracted state when subjected to a force that urges the lock head into the groove; and wherein a pair of first contact faces and a pair of second contact faces are respectively formed by the housing extending from a plurality of outer sides of the second pair of oppositely provided sidewalls, the pair of second contact faces are respectively formed by a plurality of distal ends of the pair of first contact faces extending obliquely downward, and a pair of supporting parts are formed at a respective junction of the pair of first contact faces and the pair of second contact faces.

2. The door lock of claim 1, wherein:

the pair of second contact faces are sloped faces extending downward from the pair of first contact faces, and acute angles are formed between the pair of second contact faces and the pair of first contact faces.

3. A door lock, comprising:

a housing;

a door hook hole body provided on the housing, wherein the door hook hole body comprises a top, a first pair of oppositely provided sidewalls, and a second pair of oppositely provided sidewalls, and the first pair of sidewalls and the second pair of sidewalls are formed respectively by extending downward from the lower part of the top;

a pair of clamping edges comprising a first clamping edge and a second clamping edge, the pair of clamping edges extending outward respectively from the first pair of sidewalls from the top of the door hook hole body;

a groove formed by upward recessing from the lower surface of the first clamping edge; and a lock head provided below the groove, wherein the lock head is capable of moving into or out of the groove;

wherein a pair of first contact faces and a pair of second contact faces are respectively formed by the housing extending from the outer sides of the second pair of sidewalls, the pair of second contact faces are respectively formed by the distal ends of the pair of first contact faces extending obliquely downward, and a pair of supporting parts are formed at the junctions of the pair of first contact faces and the pair of second contact faces; and wherein the pair of second contact faces are sloped faces extending downward from the pair of first contact faces, and acute angles are formed between the extended faces of the pair of second contact faces and the pair of first contact faces;

the door lock is installed in an installation hole of an installation panel through the door hook hole body, the installation hole has a pair of oppositely provided rims, the pair of oppositely provided rims comprise a first rim and a second rim, the first clamping edge of the door hook hole body is used for being installed on the first rim of the installation hole, and the second clamping edge of the door hook hole body is used for being installed on the second rim of the installation hole; and during installation, when the lock head is hung on the first rim of the installation hole, the pair of second contact faces come into contact with the installation panel.

4. The door lock of claim 3, wherein:

when the door hook hole body rotates around the supporting part, the lock head moves into the groove, and the pair of first contact faces come into contact with the installation panel; and when the door hook hole body moves toward the second rim of the installation hole, the lock head moves out of the groove.

5. The door lock of claim 3, wherein:

there is a predetermined distance between the lower surface of the second clamping edge and the pair of first contact faces, and the predetermined distance matches a thickness of the installation panel.

6. The door lock of claim 3, further comprising:

a base installed below the housing; and a cantilever, the cantilever is laterally provided on the base, and is on and outer side of the first sidewall of the first pair of sidewalls of the door hook hole body, with the lock head provided on an upper part of the cantilever.

7. The door lock of claim 6, wherein:

a proximal end of the cantilever is connected to the base, the cantilever extends laterally from the base, a distal end of the cantilever is a free end, and the lock head is connected to a side of the cantilever adjacent to the distal end.

8. The door lock of claim 7, wherein:

the distal end of the cantilever has an operating part, and by uplifting the operating part, the distal end of the cantilever moves upward, thereby driving the lock head to move upward.

9. The door lock of claim 7, wherein:

the cantilever is elastic, and elastic deformation of the cantilever enables the lock head to move into the groove.

10. The door lock of claim 7, wherein:

the lock head comprises an outwardly extending hook edge, and when the lock head is hung on the first rim of the installation hole, the outwardly extending hook edge catches the first rim of the installation hole.

11. The door lock of claim 10, further comprising:

a guiding slot, wherein the first pair of sidewalls comprise a first sidewall and a second sidewall, the guiding slot is formed by the first sidewall recessing inward, and a guide rail extending downward is provided on the outer side of the guiding slot; and the inner side of the cantilever is provided with a sliding slot extending downward;

wherein the sliding slot on the cantilever and the guide rail on the guiding slot slide with respect to one another for guiding the lock head to move up and down.

12. The door lock of claim 1, wherein:

the groove has a width capable of accommodating the lock head.

13. The door lock of claim 1, wherein:

the door hook hole body is rectangular;

the door hook hole body is provided with a door hook hole; and the pair of clamping edges are provided respectively on two sides of the door hook hole body in a length direction.

14. An electrical device, comprising:

a panel provided with an installation hole, a door lock configured for installation on the panel and including:

a housing;

a door hook hole body provided on the housing, a pair of clamping edges extending outwardly from the door hook hole body;

a groove that is bound by a u-shaped arrangement and formed by upward recessing into one of the pair of clamping edges; and a lock head provided with respect to the groove for moving into or out of the groove, wherein the lock is positioned out of the groove in a default resting state and in the groove when the lock head is urged toward the clamping edges;

a first pair of contact faces extending from the housing;

a second pair of contact faces extending from the housing;

a pair of supporting parts defined at respective junctions of the pair of first contact faces and the pair of second contact faces, wherein the pair of second contact faces extend downward and outward from their respective junctions with the pair of first contact faces at the pair of supporting parts; and wherein:

the door hook hole body of the door lock is installed in the installation hole.

15. The electrical device of claim 14, wherein: the electrical device is a washing machine.

* * * * *